(12) United States Patent
Tanaka

(10) Patent No.: US 7,538,896 B2
(45) Date of Patent: May 26, 2009

(54) DATA PROCESSING DEVICE GENERATING PRINT JOBS IN PDL AND BMI FORMATS

(75) Inventor: Yoshiaki Tanaka, Uji (JP)

(73) Assignee: Sharp Kabushiki Kaisha, Osaka (JP)

( * ) Notice: Subject to any disclaimer, the term of this patent is extended or adjusted under 35 U.S.C. 154(b) by 900 days.

(21) Appl. No.: 10/445,030

(22) Filed: May 27, 2003

(65) Prior Publication Data

US 2003/0231331 A1    Dec. 18, 2003

(30) Foreign Application Priority Data

May 31, 2002 (JP) .............................. 2002-158623

(51) Int. Cl.
*G06F 3/12* (2006.01)

(52) U.S. Cl. ..................... 358/1.13; 358/1.14; 358/1.15; 715/206; 715/513

(58) Field of Classification Search ................ 358/1.13, 358/1.14, 1.15; 715/206, 513
See application file for complete search history.

(56) References Cited

U.S. PATENT DOCUMENTS

| | | | |
|---|---|---|---|
| 6,449,053 B2 | 9/2002 | Bando | |
| 6,525,831 B1 * | 2/2003 | Evans, IV | 358/1.15 |
| 6,623,190 B1 * | 9/2003 | Lutz | 400/76 |
| 6,870,633 B1 * | 3/2005 | Kadota | 358/1.13 |
| 6,963,412 B1 * | 11/2005 | Toda | 358/1.13 |
| 7,317,550 B2 * | 1/2008 | Lester et al. | 358/1.16 |
| 2001/0043355 A1 * | 11/2001 | Bando | 358/1.15 |
| 2001/0043358 A1 * | 11/2001 | Schwartz | 358/1.15 |
| 2002/0054312 A1 * | 5/2002 | Tomita | 358/1.13 |
| 2002/0138547 A1 * | 9/2002 | Cherry et al. | 709/201 |
| 2003/0063309 A1 * | 4/2003 | Parry | 358/1.15 |
| 2003/0095281 A1 * | 5/2003 | Parry | 358/1.15 |
| 2003/0095282 A1 * | 5/2003 | Suzuki et al. | 358/1.15 |
| 2003/0112452 A1 * | 6/2003 | McIntyre | 358/1.1 |
| 2003/0217201 A1 * | 11/2003 | Gargi et al. | 710/16 |
| 2004/0205619 A1 * | 10/2004 | Twede et al. | 715/523 |

FOREIGN PATENT DOCUMENTS

JP    10-040039    2/1998

* cited by examiner

*Primary Examiner*—Twyler L Haskins
*Assistant Examiner*—Jacky X Zheng
(74) *Attorney, Agent, or Firm*—Nixon & Vanderhye P.C.

(57) ABSTRACT

The data processing device of the present invention comprises a print job generating unit 22 for generating a print job in PDL format (PDL job) and a print job in BMI (bitmap image) format (BMI job) for one data file to perform stock printing, a storage device 12 for storing both print jobs, and a means for sending to a printer 15 or 16 the stored print job in response to an instruction from a user.

9 Claims, 6 Drawing Sheets

[PDL]
　http://www.storage.com/pdl.prn
[BIT MAP IMAGE]
　http://www.storage.com/gdi.prn

[SEARCH SERVER]
　http://www.search.com

DATA PROCESSING DEVICE GENERATING PRINT JOBS IN PDL AND BMI FORMATS

FIELD OF THE INVENTION

The present invention relates to a data processing device for generating a print job for performing stock printing, storing the print job to a storage device, and demanding the storage device to send the print job to a printer in response to an instruction from a user.

DESCRIPTION OF THE RELATED ART

Along with the advancement of the internet and LAN, it has become easy to construct a network including a large number of terminal devices (personal computers), printers, servers and other devices.

There has been developed a system enabling stock printing to be performed in such a network.

Stock printing is a printing method that sends a printing instruction from an arbitrary device (terminal device, printer etc.) in the network to a storage server (storage) in the network storing the print job (print command), thereby enabling printing to be performed using a desired printer.

According to the stock printing method, the user can store the print job created at the terminal device to a storage server, and then output the print job from the desired printer at a desired timing for as many times as necessary.

Moreover, it is possible for other users to print out the print job stored in the storage server.

A system such as the above-explained stock printing that performs printing using a network is disclosed for example in Japanese Patent Laid-Open No. 10-40039. In the disclosed system, a print job in the form of a PDL data created at a terminal is transmitted to a converting device, where the data is converted into a normal bitmap image data (BMI data; raster image data) and then sent to a printer.

Thus, according to the above system, there is no need to provide to every printer a converting device for converting the PDL data into BMI data (or, there is no need to prepare a printer corresponding to PDL format), so the cost of the whole system can be cut down. Since a PDL format having a small data quantity is used, the traffic of the network can be reduced.

However, in such a system where the print job is sent and received in PDL format, the printing had to be put on hold when the converting device and/or the printer corresponding to PDL format are not available at that moment (for example, when these devices are currently used or out of order).

SUMMARY OF THE INVENTION

The present invention is aimed at solving the above-mentioned problems of the prior art. The object of the invention is to provide a data processing device and a printing system capable of performing printing without a waiting period even if converting devices or PDL-corresponding printers are not available.

The data processing device of the present invention comprises a print job generating unit for stock printing that generates a print job in PDL format (PDL job) and a print job in BMI (bitmap image) format (BMI job) for one data file and storing both print jobs in a storage unit, the stored job being sent to a printer in response to an instruction from a user.

According to this structure, the print job generating unit generates two forms of print jobs, a PDL print job (PDL job) and a BMI (bitmap image) print job (BMI job), for a single file, and stores these jobs in the storage unit so that the user can print out the print job having the desired format. Preferably, during a regular state, the print job in PDL format is printed, and when the PDL printer is not available (irregular state), an alternative printer can be used to print out a print job in BMI format. Thus, during regular state, the printing is performed with high speed and high image quality, while during irregular state, the printing can still be performed without a waiting period.

The BMI print job being generated by the data processing device of the present invention is formed in a device-independent format.

According to this construction, the image being printed by the alternative printer has a quality equivalent to that printed by the PDL printer.

The BMI print job generated by the data processing device of the present invention characterizes in having a lower resolution than the PDL job, or having received irreversible compression, or having been compressed in block units.

In general, the print job in BMI format is greater in size than the print job in PDL format. Therefore, by reducing the resolution of the BMI or by compressing the BMI, the disc capacity of the storage unit can be saved and the transfer time shortened. Furthermore, by compressing the BMI, the texts or lines can be prevented from becoming jaggy when reduced in size, so the degradation of image quality of the texts or lines can be suppressed. Moreover, when compression is performed in units of blocks (in page units), there is no need to provide to the printer a page memory for decompressing the BMI.

According to the present data processing device, the storage unit for storing the BMI job is a removable medium.

This construction enables printing to be performed by an alternative printer that is not connected to the network.

The data processing device according to the present invention further comprises a display screen; and the print job generating unit creates data for performing stock printing that describes the locational information of the PDL job and the BMI job interrelatedly, the data being stored in the storage unit, and the data corresponding to the instruction is displayed on the screen.

According to this construction, the user can select easily the print job (PDL job or BMI job) that the user wishes to print.

The data processing device of the present invention characterizes in that the data for performing stock printing is described in a markup language.

When the data is described using a markup language such as XML and HTML, the PDL job and the BMI job can be downloaded easily through use of a browser.

Moreover, the data processing device of the present invention characterizes in that it sends the print job stored in the storage unit to the printer via a network, the data processing device further comprising a search unit for searching an available printer within the network, and the data for performing stock printing contains positional information of the storage unit and the search unit.

The above construction enables the device to search for available printers easily.

According to the data processing device of the present invention, the format of the BMI job corresponds to a multi-page format.

The above construction enables a BMI job containing plural pages to be formed as a single file. Thus, the handling (selecting etc.) of the BMI job becomes facilitated.

According to the data processing device of the present invention, the PDL job and the BMI job contain header information.

The above construction enables the printing to be performed in the form desired by the user when the BMI job is selected, even if the header information is defined by a PDL command, since the BMI data and the header information are separated.

The data processing device of the present invention comprises a print job generating unit for generating plural print jobs in different formats for one data file, wherein all the plural print jobs are stored in the storage unit, and the stored print job is sent to the printer.

By having two or more kinds of print jobs indifferent formats stored in the storage device, the user can perform printing using the print job having the desired format. Especially, when the user attempts to perform printing using an object printer and stores the data in a determined format, but the object printer cannot be used when desired, the user can still perform the printing using an alternative printer by utilizing the print job in a format corresponding to the alternative printer. Further, the printing can be performed using a print job with an appropriate format that corresponds to the environment (speed, image quality) of the object printer, enabling the printout to be performed in high speed or with high quality.

Moreover, the data processing device of the present invention comprises a search unit for searching the type of printer available in the network and displaying the search result; and a print job generating unit for generating a print job in a format corresponding to the printer and sending the job to the printer, the print job generating unit generating a print job corresponding to the printer being designated by a user through the network based on the search result conducted by the search unit, and sending the print job to the printer designated by the user to perform printing.

A printing system according to the present invention comprises a data processing device equipped with a print job generating unit for generating a plurality of print jobs; a storage unit for storing the print job transmitted from the data processing device, and sending the print job to a printer in response to a print instruction; a printer; and a network connecting the data processing device, the storage unit and the printer.

A data processing method according to the present invention comprises generating a PDL format print job and a BMI format print job as print job for one data file; storing both print jobs for stock printing; and sending to a designated printer the print job corresponding to the environment of the designated printer based on the instruction from a user.

A computer software according to the present invention comprises a program for processing a print job in the data processing device described above.

A computer software according to the present invention comprises a program for executing the data processing method mentioned above.

A recording medium according to the present invention records the computer program described above.

DETAILED DESCRIPTION OF THE PREFERRED EMBODIMENT

We will now explain a preferred embodiment of the present invention.

The network system according to the present embodiment (present system) is designed to enable stock printing using a terminal device, a printer and a storage server connected to a network.

The term "stock printing" refers to a printing method for performing printing through a desired printer by sending a print order from a device connected to a network to a storage server also connected to the network and storing a print job.

In the following description, the storing of a print job in the storage server for stock printing is simply called "stock".

Moreover, in the following description, the printing form of directly sending a print job from the terminal device to the printer and performing printing immediately is called "direct printing".

First, the configuration of the present printing system will be explained.

Figure 1:
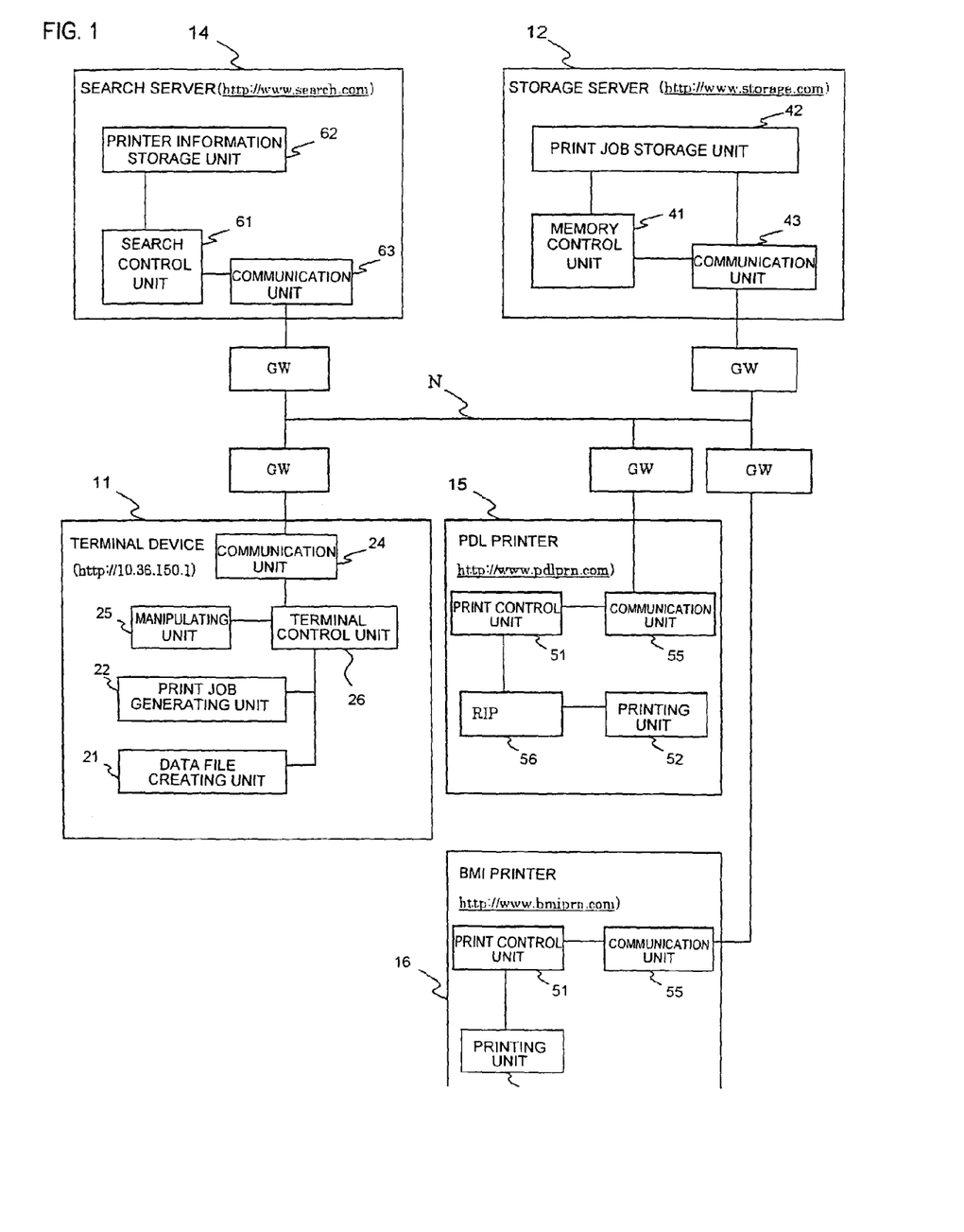
FIG. 1 is an explanatory view showing the configuration of the present invention in simplified form.

FIG. 1 is an explanatory view showing in simplified form the configuration of the present invention. As shown in the drawing, the present system comprises a terminal device (client computer) 11, a storage server (storage service) 12, a search server 14, a PDL printer 15 and a BMI printer 16 on a network N.

The terminal device 11 functioning as a job generating device is a data processing device for generating and storing data files containing for example documents, diagrams and graphs, and generating a print data (which will be detailed later).

The terminal device 11 also has a function to create a print job including print data. When the generated print job should be printed immediately (when performing direct printing), the terminal device 11 sends the print job to a printer 15 or 16. On the other hand, when the user wishes to stock (store) this print job for stock printing, the print job is sent to a storage server 12.

The terminal device 11 comprises a print job processing unit that sends an order to the storage server 12 storing the print job to send the print job to a designated printer 15 or 16 when performing stock printing.

Moreover, when stocking a print job, the terminal device 11 generates two kinds of print jobs, a print job (PDL job) including a print data in a PDL format (PDL data) and a print job (BMI job) including a print data in a BMI (bitmap image) format (BMI data), and sends the two print jobs to the storage server 12.

The storage server 12 is a server used for stock printing, and a plural number of storage servers are installed in the present system.

The storage server 12 stores the print job transmitted, from the terminal device 11 as a print job for stock printing. Then, in response to the print order received from the terminal device 11, the server sends the designated print job to a designated printer 15 or 16.

The printers (printing devices) 15 and 16 are printing devices for receiving the print job sent from the terminal device 11 or the storage server 12 and for outputting (printing) the print data included in the print job on a sheet (recording paper). Especially, the PDL printer 15 is designed to print PDL data. The BMI printer 16 is designed to print BMI data.

Similar to the terminal devices 11 and storage servers 12, the present system comprises a plurality of printers 15 and 16.

The search server 14 searches the location (URL) and the type of usable printers (the format of the print job (PDL or BMI) that the printer is capable of printing) in the network in response to the demand from the terminal device 11.

Next, we will explain in further detail the configuration of the present system.

First, we will describe the terminal device 11. As shown in FIG. 1, the terminal device 11 comprises a data file creating unit 21, a print job generating unit 22, a communication unit 24, a manipulating unit 25 and a terminal control unit 26.

The manipulating unit 25 comprises an input unit equipped with a mouse and a keyboard, and a display unit composed of a LCD (liquid crystal display), both of which are not shown. These are used to receive input of order from the user and to transmit the same to the terminal control unit 26, and to display a screen corresponding to the control of the terminal control unit 26.

The manipulating unit 25 also functions as a browser for handling the data created using a markup language (XML, HTML etc.).

The terminal control unit 26 is a control unit composed of a MPU, a CPU and the like for controlling all the operations performed by the terminal device 11, and functions as the nerve center of the terminal device 11.

The data file creating unit 21 comprises various software such as software for creating documents, diagrams/graphs, spreadsheets and database, or for browsing through the internet, and using such software, the data file creating unit creates a data file based on the instruction from the user.

The print job generating unit 22 generates a print job according to each data file for printing each data file created by the data file creating unit 21.

The print job handled by the present system is constituted of a print data and a header. The print data is a data obtained by converting various forms of data files into printable format. According to the present system, the terminal device 11 generates print data in the form of PDL or BMI.

The header is a data (header information) including the printer format information (data for setting up the printing format such as the sheet size, the number of sheets to be printed, the selected print face, the variety of N-up etc.) and the attribute information (such as the creator, the terminal by which the job was created, the date and time of creation) of the print job.

Figure 2:
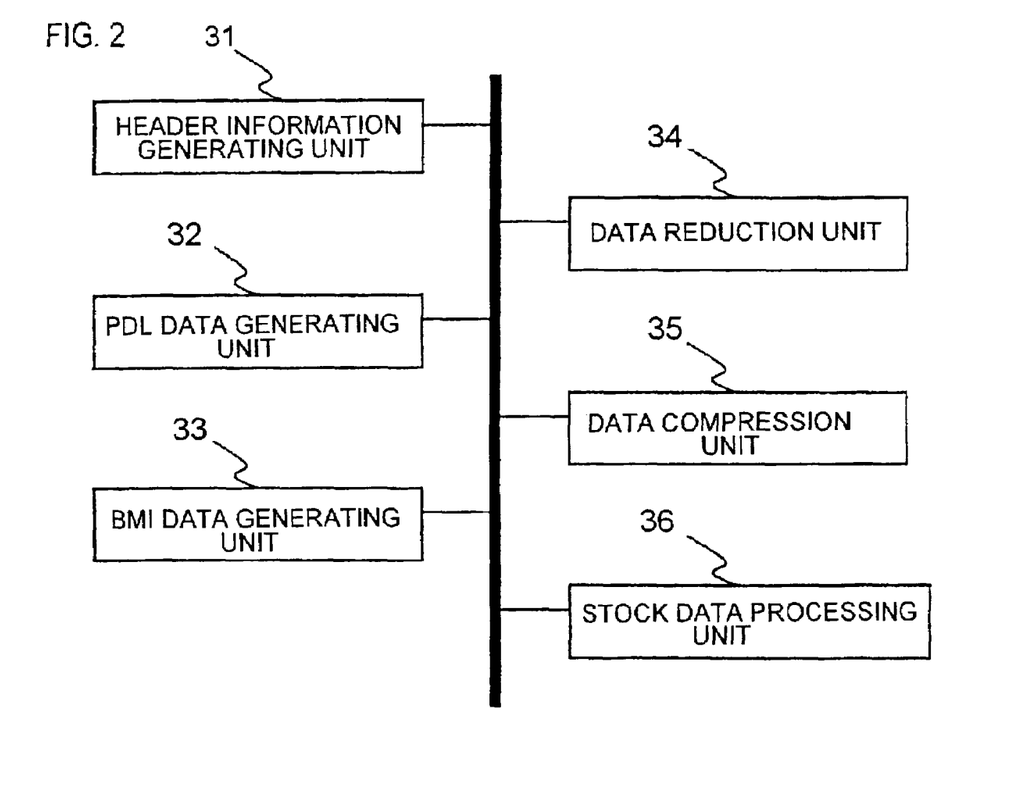
FIG. 2 is an explanatory view showing the configuration of the print job generating unit.

FIG. 2 is an explanatory view showing the configuration of the print job generating unit 22. As shown in the drawing, the print job generating unit 22 comprises a header information generating unit 31, a PDL data generating unit 32, a BMI data generating unit 33, a data reduction unit 34, a data compression unit 35 and a stock data processing unit 36.

The header information generating unit 31 generates a header in a print job based on the header information being input by the user.

Figure 6:
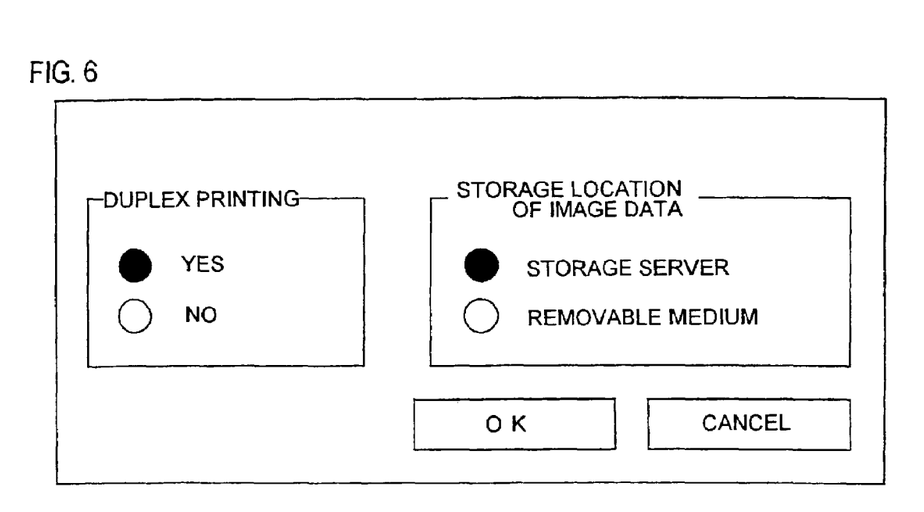
FIG. 6 is an explanatory view showing an example of a screen for a user to input header information.

FIG. 6 is an explanatory view showing an example of an input screen for the header information to be input by the user. In the example illustrated in the drawing, the user is capable of inputting (selecting) the header information related to the printing face (duplex printing/one-side printing).

The PDL data generating unit 32 generates PDL data corresponding to the data file generated by the data file generating unit 21. The BMI data generating unit 33 generates BMI data corresponding to the same data file.

The data reduction unit 34 converts the BMI data generated by the BMI data generating unit 33 to a data having smaller resolution. Further, the data compression unit 35 provides compression processing (baseline JPEG compression processing) to the BMI data being generated by the BMI data generating unit 33, and creates a compressed data having a small capacity.

Furthermore, when the terminal device 11 creates a print job to be stocked, it creates two jobs, a print job including a print data in PDL data (PDL job) and a print job including a print data in BMI data (BMI job).

When these two print jobs (PDL job and BMI job) are created for stock, the stock data processing unit 36 stores the information including the storage address of these jobs (positional information; job URL) as stock data to a memory unit not shown.

In the present description, job URL includes the positional information of the storage server 12 to which the print job is addressed to and the name of the print job (information for specifying the print job).

Figure 3:
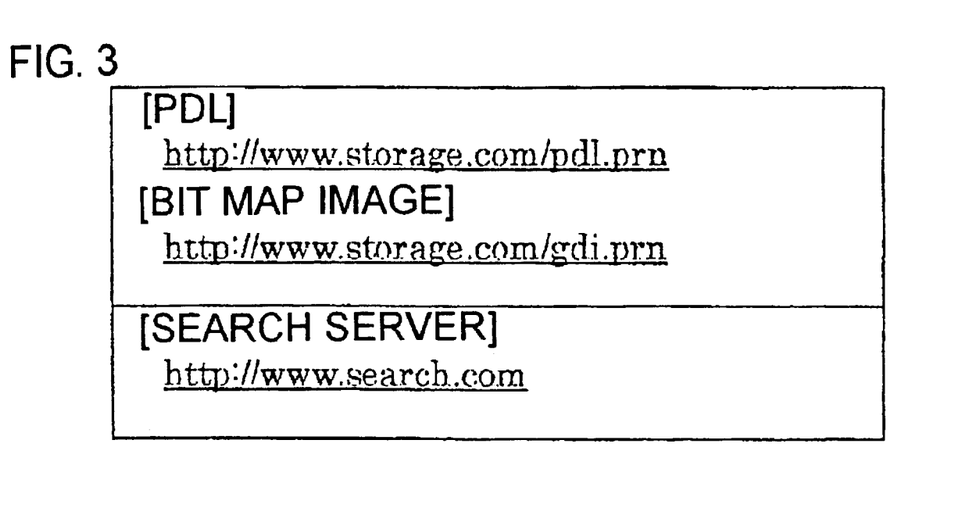
FIG. 3 is an explanatory view showing the example of the stock data displayed on a display unit.

The stock data processing unit 36 is designed to describe the URL of the search server 14 in the network to the stock data together with two job URLs. FIG. 3 is an explanatory view showing an example of a stock data displayed on the display unit of the manipulation unit 25.

The communication unit 24 is a communication interface for acquiring data transmitted from an external device (such as a storage server 12, printers 15 or 16) via the network N and a gateway (GW) for the terminal device, and transmitting the same to the terminal control unit 26.

The communication unit 24 also comprises a function to transmit print jobs and data files to the external device via the GW and the network N in response to the instruction from a terminal control unit 26 (or user).

Next, the storage server 12 will be described in detail. As shown in FIG. 1, the storage server 12 comprises a memory control unit 41, a print job storage unit 42 and a communication unit 43.

The print job storage unit 42 is a storage unit that stores the print job transmitted from the terminal device 11 based on the control of the memory control unit 41.

The communication unit 43 is a communication interface for acquiring the data transmitted from an external device (terminal device 11) via the network N and the gateway (GW) for the storage server, and transmitting the same to the memory control unit 41.

The communication unit 43 also comprises a function to transmit print jobs etc. to the external device via the GW and the network N in response to the instruction from the memory control unit 41.

Similar to the terminal control unit 26 of the terminal device 11, the memory control unit 41 is a control unit composed of a MPU, a CPU and the like for controlling all the operations performed by the storage server 12, and functions as the nerve center of the storage server 12.

The memory control unit 41 stores the print job transmitted from the terminal device 11 to the print job storage unit 42. On the other hand, when the storage control unit 41 receives a printing instruction (instruction including data designating the job URL and the printer to be used) from the external device, the unit 41 retrieves the print job corresponding to the job URL from the print job storage unit 42. Then, it controls the communication unit 43 to send the job to the designated printer 15 or 16.

Next, the search server 14 will be described in detail.

The search server 14 comprises a search control unit 61, a printer information storage unit 62 and a communication unit 63.

The printer information storage unit 62 is a database storing the performance and URL of printers being installed or registered in the network.

The communication unit 63 is a communication interface for acquiring the search instruction transmitted from an external device (terminal device 11) via the network N and the gateway (GW) for the search server 14, and transmitting the same to the search control unit 61.

The communication unit 63 also functions to transmit the search result to the external device via the GW and the network N according to the instruction from the search control unit 61.

Similar to the terminal control unit 26 of the terminal device 11, the search control unit 61 is a control unit composed of a MPU, a CPU and the like for controlling all the operations performed by the search server 14, and functions as the nerve center of the search server 14.

Based on the search instruction transmitted from the external device, the search control unit 61 searches the network and specifies the printer that can be used immediately (the printer in idling status) in the network. Then, the unit 61 sends the specified printer information to the external device from which the search instruction has been sent.

Next, the printers 15 and 16 will be explained in detail. As shown in FIG. 1, the printers 15 and 16 are each equipped with a print control unit 51, a printing unit 52 and a communication unit 55.

Similar to the above-mentioned terminal control unit 26 or the memory control unit 41, the print control unit 51 is a control unit composed of a MPU, a CPU and the like for controlling all the operations performed by the printer 15 or 16, and functions as the nerve center of the printer 15 or 16.

The communication unit 55 is a communication interface for acquiring the data transmitted from an external device (terminal device 11 or storage server 12) via the network N and the gateway (GW) for the printer, and transmitting the same to the print control unit 51.

The printing unit 52 receives the print job transmitted from the external device and outputs the print data on a sheet (recording paper) based on the header information.

The PDL printer 15 is further equipped with a RIP 56 in addition to the above units. The RIP 56 is a converter for converting PDL data into BMI data.

Now, the operation according to the present system will be explained in detail.

Figure 4:
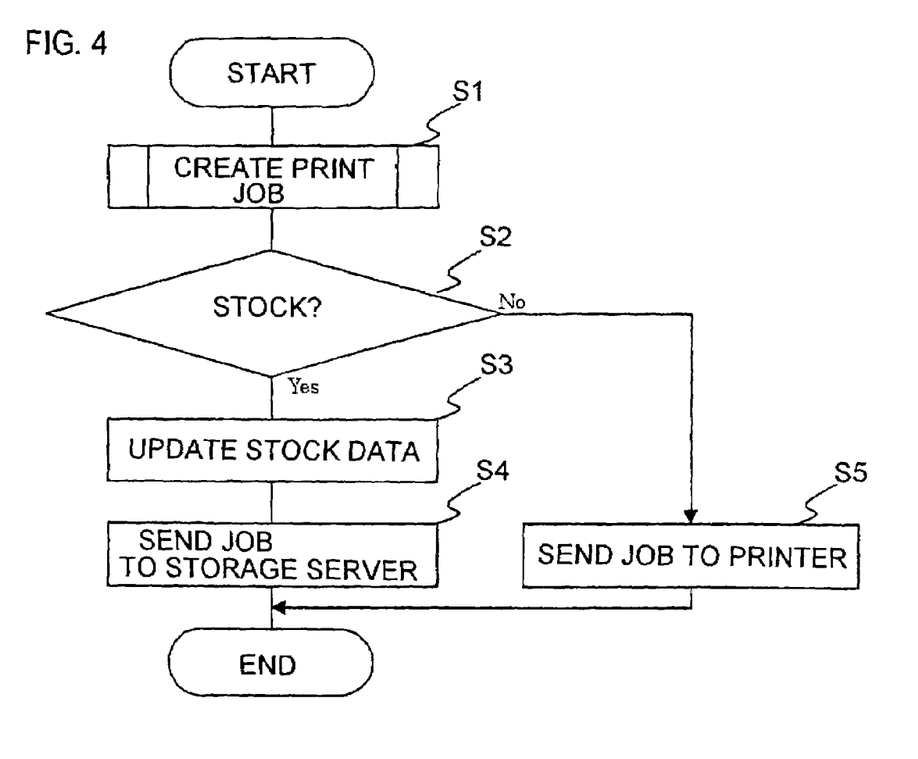
FIG. 4 is a flowchart showing the print job generating process in a terminal device.

FIG. 4 is a flowchart showing the operation for generating a print job in the terminal device 11. As illustrated in the flowchart, when the terminal control unit 26 of the terminal device 11 receives an instruction to print the data file designated by the user (start), it waits for input of an instruction by the user (input of instruction related to whether the print job should be stocked or put to direct printing) (S1, S2).

Thereafter, when an instruction for direct printing is received in S2, the terminal control unit 26 controls the print job generation unit 22 and generates a print job in the data format designated by the user (PDL job or BMI job).

Thereafter, the terminal control unit 26 transmits (sends) the created print job to either the PDL printer 15 or the BMI printer 16, and terminates the process.

On the other hand, when an instruction for stock printing is received in S2, the terminal control unit 26 controls the print job processing unit 22 to execute a print job creating process detailed later, thereby creating a print job, and to update the stock data (S3). Thereafter, the terminal control unit 26 transmits the created print job to the storage server 12 (S4) and terminates the process.

Figure 5:
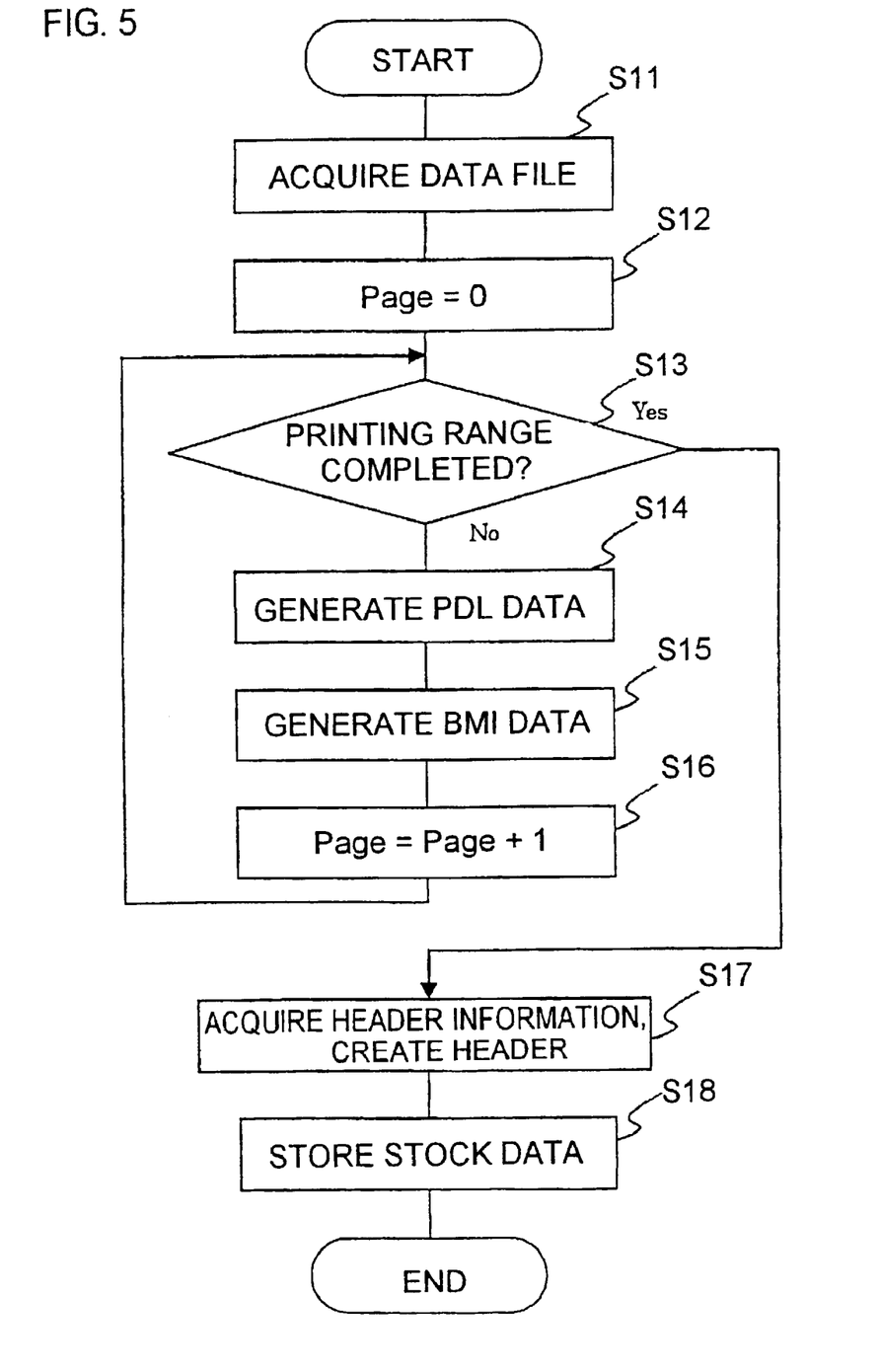
FIG. 5 is a flowchart of a print job generating process.

Next, the process for creating a print job according to the step for determining whether to stock data will be explained. FIG. 5 is a flowchart showing the flow of this process.

As shown in the drawing, according to this process, the PDL data generating unit 32 and the BMI data generating unit 33 of the print job generating unit 22 having received the instruction from the terminal control unit 26 acquires the data file designated by the user from the data file creating unit 21 (S11).

Then, the data generating units 32 and 33 each convert the printing range in the data file (the range designated in advance by the user; set by the page number) into print data one page at a time (S12 through S16).

At this time, each of the data generating units 32 and 33 first sets a variable "Page" used in the process to zero (Page=0), and adds 1 to the variable "Page" each time one page worth of print data is generated. Then, the data generating units 32 and 33 each determine that the printing range is completed when the variable "Page" exceeds the printing range.

Thereafter, the header information generating unit 31 of the print job generating unit 22 acquires the header information (print format information and attribute information) having been input by the user, and creates a header based on that information (S17)

Thus, a PDL job and a BMI job are generated from the print data and the header acquired by steps S12 through S16.

Next, the stock data processing unit 36 of the print job generating unit 22 creates a job URL containing the URL of the storage server 12 being designated in advance by the user (or being newly input) and the names of the two created print jobs. Then, the job URL is stored together with the URL of the search server 14 having been determined in advance as stock data to a memory unit not shown (S18), and the process is terminated.

According to the above-explained process, the terminal device 11 records the stock data related to the two print jobs sent to the storage server 12.

When the user wishes to send a print instruction related to this job from the terminal device 11, the user inputs the instruction through the manipulation unit 25. Upon receiving the input, the terminal control unit 26 displays the stock data on the display unit of the manipulation unit (browser) 25.

The user selects from the stock data the URL of the search server 14 corresponding to the print job that is to be printed. By this action, an instruction is sent to the search server 14 to search the printer in idling state connected to the network. Then, based on the printer information sent from the search server 14, the user determines whether to use the PDL job or the BMI job for printing (normally, when a PDL corresponding printer is available, the PDL job is used).

Thereafter, the user at the terminal device 11 selects the URL of the printer to be used and the job URL of the print job to be used for printing (the user clicks the corresponding portion with a mouse). Thereby, the terminal control unit 26 generates a print instruction containing the selected URLs and transmits the same to the storage server 12.

Upon receiving this print instruction, the memory control unit 41 of the storage server 12 retrieves the print job corresponding to the designated job URL from the print job storage unit 42 and sends the job to the designated printer.

As explained above, upon stocking a print job for stock printing, the terminal device 11 of the present system is capable of generating a PDL job and a BMI job corresponding to a single data file and storing them to the storage server 12.

By having two forms of print jobs stored in the memory, the user can select the desired format of print job for printing. Especially, it is possible to use a PDL printer 15 during regular state to print out the PDL job, and when the PDL printer 15 is not available (irregular state), the BMI printer 16 (alternative printer) can be used to print out the BMI job. According to this example, high speed printing with high image quality can be executed regularly, but even during an irregular state, the printing can be performed without a waiting period.

The terminal device 11 creates and stores a stock data containing positional information correlating the PDL job and the BMI job, and displays the information on the screen upon receiving instruction from the user. This enables the user to select with ease the print job (PDL job or BMI job) to be printed.

Further, the terminal device 11 is designed to describe the stock data in markup language. Thus, the PDL job and the BMI job can be downloaded easily using a browser.

Since the stock print job being generated includes the positional information of the search server 14 for searching the available printers in the network, the terminal device 11 can easily acquire the search result of the available printers.

The PDL job and the BMI job generated by the terminal device 11 contain header information, so even if the header information is defined by a PDL command, it is possible to print the BMI job in a format desired by the user since the BMI data is separated from the header information.

The BMI data generating unit 33 should preferably generate the BMI job in a format that is not dependent on the device. Thereby, a printout having the same image quality as when utilizing the PDL printer can be performed by using the alternative printer.

The BMI data generating unit 33 can utilize the data reduction unit 34 to reduce the resolution of the BMI data (BMI printing data) compared to that of the PDL data when generating the BMI job.

Further, the BMI data generating unit 33 can utilize the data compression unit 35 to provide irreversible compression to the BMI data of the BMI job. In this case, the data compression unit 35 should preferably compress the BMI data in block units.

In general, the BMI job is larger in size than the PDL job. Therefore, by lowering the resolution of the BMI data or by compressing the BMI data to reduce the size thereof, the disc capacity of the storage server 12 can be saved and the transmission time shortened. Further, when the data is compressed, the text or line of the image can be prevented from becoming jaggy even when the size is reduced, so the image quality of the lines and texts will not be deteriorated. Further, if the compression is performed in units of blocks (in units of pages), there is no need to provide a page memory for decompressing BMI to the printers 15 and 16.

Furthermore, according to the present embodiment the stock data is stored in the terminal device 11. However, the stock data can be stored in a recording medium that can be removed from the terminal device 11 and carried.

When performing stock printing in this case, the user attaches the recording medium to a predetermined position in the terminal device 11. Then, the terminal control unit 26 of the terminal device 11 reads out the stock data and displays the same on the screen to thereby let the user select the job to be printed.

Further, it is possible to provide a search screen generating unit to the search server 14. The search screen generating unit is for creating and sending to the terminal device 11 a detailed setup screen for searching printers in response to the search instruction output from the terminal device 11.

Moreover, according to the present embodiment, the two print jobs to be stocked are both stored in the storage server 12. However, the BMI job can be stored in a recording medium (removable medium) mounted on the terminal device 11 in a removable manner. In such case, the user selects the storage location of the BMI job on the screen for inputting the header information shown in FIG. 6. Thus, if the PDL corresponding printer is not available, the user can designate a printer that does not belong to the network for printing the BMI job.

It is also possible to store both the BMI job and the PDL job in the removable medium.

The BMI data generating unit 33 should preferably generate the BMI job in a multi-page format. Thereby, when there are plural pages in the BMI job, the pages can be managed as one file, facilitating the handling (selecting etc.) of the BMI jobs.

Though according to the present embodiment, an independent search server 14 is connected to the network, but the search server 14 can be incorporated in the terminal device 11.

Furthermore, when performing direct printing, the printer to be used for printing can be searched through the search server 14. Then, the terminal control unit 26 can generate a print job in the format corresponding to the search result (or corresponding to the instruction of the user) and send the same to the printer.

As explained, the present invention enables printing to be performed without a waiting time even when the converting device or the PDL corresponding printer is not available in the network.

What is claimed is:

1. A data processing device for generating a print job for stock printing, storing the print job in a storage unit, and sending the stored print job to a printer in response to an instruction from a user; said data processing device comprising:

a print job generating unit which generates a print job in PDL format and a print job in BMI (bit map image) format, each print job representing the same data file in its entirety, and sends both print jobs to the storage unit for storage, wherein each of the print job in PDL format and the print job in BMI format are generated by the data processing device for the same one data file in its entirety and are each stored in the storage unit so that they coexist in the storage unit so that each of the print job in PDL format and the print job in BMI format can be selectively retrieved for printing at respective printers, wherein the data processing device further comprises a display screen; and the print job generating unit creates data for performing stock printing that describes a positional information of the print job in PDL format and the print job in BMI format, said data being stored in the storage unit, and data corresponding to the instruction is displayed on the screen, and wherein the data processing device sends the print job stored in the storage unit to the printer via a network, the data processing device further comprising a search unit for searching an available printer within the network, and said data for performing stock printing contains positional information of the storage unit and the search unit.

2. The data processing device according to claim 1, wherein the print job in BMI format is generated in a device-independent format.

3. The data processing device according to claim 1, wherein the print job in BMI format has a lower resolution than the print job in PDL format.

4. The data processing device according to claim 1, wherein lossy compression is performed to the print job in BMI format.

5. The data processing device according to claim 4, wherein the print job in BMI format is compressed in block units.

6. The data processing device according to claim 1, wherein the storage unit for storing the print job in BMI format is a removable medium.

7. The data processing device according to claim 1, wherein the data for performing stock printing is described in a markup language.

8. The data processing device according to claim 1, wherein the print job in BMI format corresponds to a multi-page format.

9. The data processing device according to claim 1, wherein the print job in PDL format and the print job in BMI format contain header information.

* * * * *